United States Patent
Palla et al.

(10) Patent No.: US 10,412,889 B2
(45) Date of Patent: Sep. 17, 2019

(54) COMBINE HARVESTER CONTROL INFORMATION FOR A REMOTE USER WITH VISUAL FEED

(71) Applicant: Deere & Company, Moline, IL (US)

(72) Inventors: Bhanu Kiran Reddy Palla, Bettendorf, IA (US); Narendar Reddy Karedla, Maharashtra (IN)

(73) Assignee: Deere & Company, Moline, IL (US)

( * ) Notice: Subject to any disclaimer, the term of this patent is extended or adjusted under 35 U.S.C. 154(b) by 14 days.

(21) Appl. No.: 15/832,056

(22) Filed: Dec. 5, 2017

(65) Prior Publication Data
US 2019/0166760 A1 Jun. 6, 2019

(51) Int. Cl.
*A01D 41/12* (2006.01)
*H04L 29/08* (2006.01)
*A01D 41/127* (2006.01)
*H04L 29/06* (2006.01)
*A01D 41/06* (2006.01)

(52) U.S. Cl.
CPC .... *A01D 41/1274* (2013.01); *H04L 29/06047* (2013.01); *H04L 29/0899* (2013.01); *H04L 29/08099* (2013.01); *A01D 41/06* (2013.01)

(58) Field of Classification Search
CPC ............... A01D 41/1274; A01D 41/06; H04L 29/06047; H04L 29/08099; H04L 29/0899
See application file for complete search history.

(56) References Cited

U.S. PATENT DOCUMENTS

| | | | |
|---|---|---|---|
| 6,633,800 B1 * | 10/2003 | Ward | B60W 50/02 180/167 |
| 8,577,538 B2 * | 11/2013 | Lenser | G05D 1/0274 701/2 |
| 2006/0150602 A1 | 7/2006 | Stimmann | |
| 2011/0288695 A1 * | 11/2011 | Gariepy | G05D 1/0027 701/2 |
| 2012/0095619 A1 * | 4/2012 | Pack | G05D 1/0038 701/2 |
| 2012/0215380 A1 * | 8/2012 | Fouillade | G05D 1/0038 701/2 |
| 2013/0056032 A1 * | 3/2013 | Choe | A47L 9/0488 134/18 |
| 2013/0060379 A1 * | 3/2013 | Choe | G06N 3/008 700/245 |
| 2014/0170617 A1 * | 6/2014 | Johnson | G09B 5/06 434/219 |
| 2014/0240506 A1 * | 8/2014 | Glover | H04N 7/181 348/159 |
| 2015/0128547 A1 | 4/2015 | Einecke et al. | |

* cited by examiner

*Primary Examiner* — Tyler J Lee
(74) *Attorney, Agent, or Firm* — Joseph R. Kelly; Kelly, Holt & Christenson PLLC

(57) ABSTRACT

A user device, that is remote from a combine harvester, communicates with the remote harvester to receive contextual information indicative of machine settings on the combine harvester. Remote view and control logic receives the contextual information from the combine harvester, along with image or video display information generated from an image capture device (such as a video camera or other image capture device) on the combine harvester. The contextual information is displayed, along with the video or image information on the remote user device.

20 Claims, 15 Drawing Sheets

COMBINE HARVESTER CONTROL INFORMATION FOR A REMOTE USER WITH VISUAL FEED

FIELD OF THE DESCRIPTION

The present description relates to a control interface for an agricultural machine. More specifically, the present description relates to a control interface for a remote operator of a combine harvester, that includes image or video data.

BACKGROUND

There are a wide variety of different types of equipment, such as construction equipment, turf management equipment, forestry equipment, and agricultural equipment. These types of equipment are operated by an operator. For instance, a combine harvester (or combine) is operated by an operator, and it has many different mechanisms that are controlled by the operator in performing a harvesting operation. The combine may have multiple different mechanical, electrical, hydraulic, pneumatic, electro-mechanical (or other) subsystems, some or all of which can be controlled, at least to some extent, by the operator.

The systems may need the operator to make a manual adjustment outside the operator's compartment or to set a wide variety of different settings and provide various control inputs in order to control the combine. Some inputs not only include controlling the combine direction and speed, but also threshing clearance and sieve and chaffer settings, rotor and fan speed settings, and a wide variety of other settings and control inputs.

Because of the complex nature of the combine operation, it can be very difficult to know how a particular operator or machine is performing in a given harvesting operation. While some systems are currently available that sense some operational and other characteristics, and make them available to reviewing personnel, those systems are normally informational in nature.

The discussion above is merely provided for general background information and is not intended to be used as an aid in determining the scope of the claimed subject matter.

SUMMARY

A user device, that is remote from a combine harvester, communicates with the remote harvester to receive contextual information indicative of machine settings on the combine harvester. Remote view and control logic receives the contextual information from the combine harvester, along with image or video display information generated from an image capture device (such as a video camera or other image capture device) on the combine harvester. The contextual information is displayed, along with the video or image information on the remote user device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
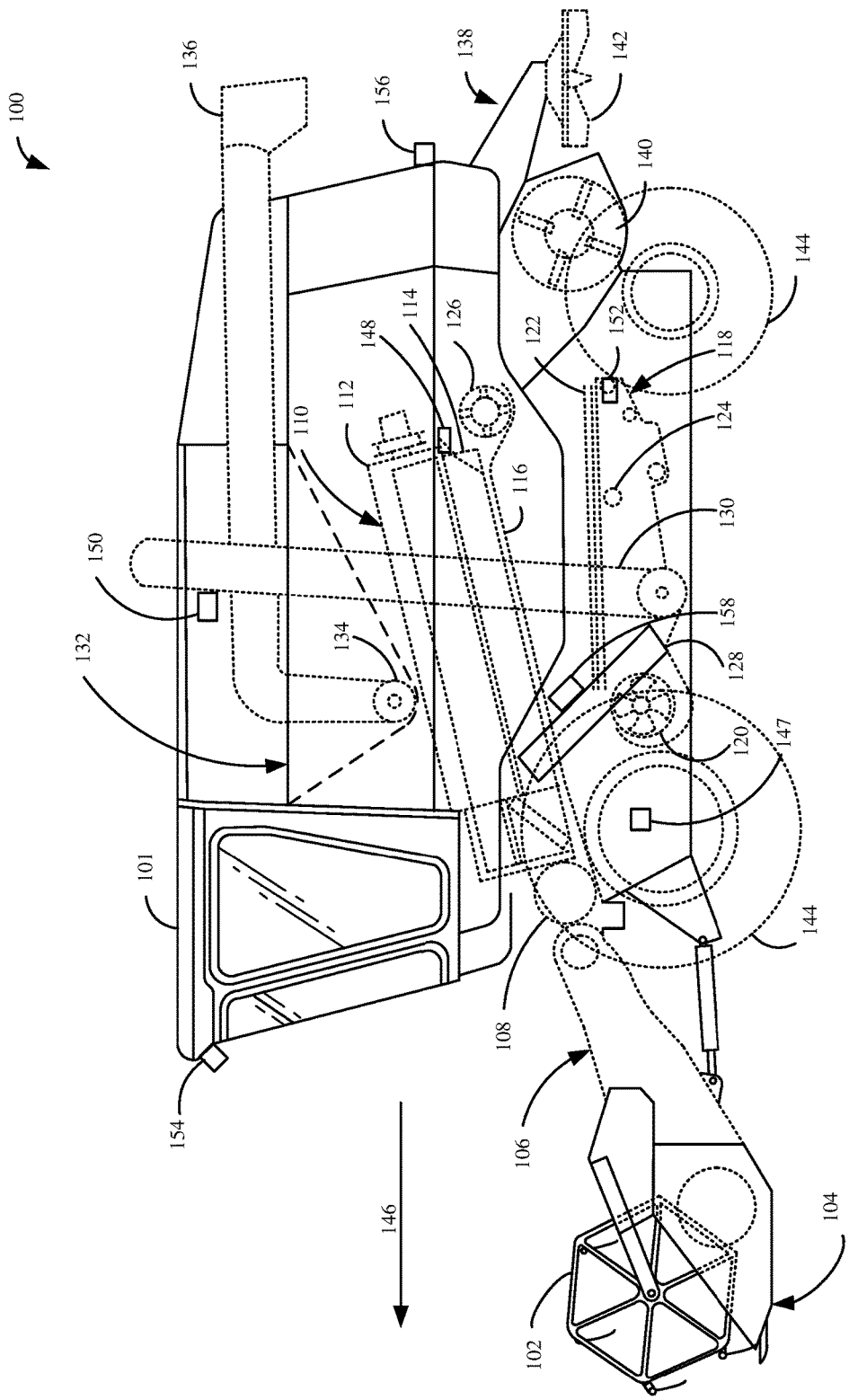
FIG. 1 is a partial pictorial, partial schematic illustration of a combine harvester.

Combine harvesters often have a wide variety of sensors or inputs that sense or identify a variety of different variables, such as operating parameters, machine settings, machine configuration, crop characteristics, environmental parameters, etc. The sensors can communicate this information over a controller area network (CAN) bus (or another network, such as an Ethernet network, or even wireless networks, etc.) to various systems that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to determine how a particular machine, or operator, is performing and why. This problem is exacerbated when a particular organization has a plurality of different combine harvesters that are all operating at the same time. These combine harvesters are often referred to as a "fleet" of harvesters.

The operation of the fleet of harvesters is often overseen by a (remote or local) fleet manager (or farm manager) who is located remotely relative to at least some of the combine harvesters in the fleet. It can be extremely difficult for a farm manager or remote manager to determine how the various combine harvesters are operating in the fleet, how they are operating relative to one another, how they are operating relative to other similarly situated harvesters, etc.

It is also extremely difficult for a remote manager to identify performance criteria for the various operators and machines, and determine how they compare relative to one another, in near real time. Thus, it is very difficult for a remote manager to attempt to modify the settings on any combine harvester to increase the performance of that harvester. This is because the remote manager does not have access to the current settings of a particular machine, nor does the remote manager have access to an interface that allows the remote manager to view and interact with display elements that indicate how various machines and operators are performing relative to one another.

Instead, the remote manager often needs to review data after the harvesting season, and even then the task is difficult. The remote manager often needs to switch between different applications, between different views of data, for the different machines and operators, in an attempt to compare the data in this way. This results in a relatively large amount of bandwidth consumption, because the operator often needs to make many different calls from his or her device to a remote data store where the information is stored.

Some systems currently allow remote viewing of settings, to some extent. One drawback is the delay time involved. In current systems, there may be a delay of thirty minutes or more. Even if the machine settings were shown in real time (or near real time), they are often represented as numeric values which can be difficult to interpret. The present description thus describes a remote user interface that shows both current data (such as machine settings or sensor data) along with relevant image or video data. A user actuatable control input mechanism can also be provided for remote control of the agricultural machine.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, one or more cleaning shoe loss sensors 152, forward looking camera 154, rearward looking camera 156, a tailings elevator camera 158, and a wide variety of other cameras or image/video capture devices. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

Cameras 150, 154, 156 and 158 illustratively capture video or still images that can be transmitted to, and displayed on, a display in operator compartment 101 or a remote device (shown in more detail below) in near real time. Clean grain camera 150, for instance, generates a video feed showing grain passing into clean grain tank 132 (or through clean grain elevator 130). Camera 154 can illustratively generate a video feed showing a view forward of operator compartment 101, such as showing header 102 and/or the crop in front of header 102. Cameras 156 and 158 illustratively generate a video feed showing the tailings in elevator 158 and the discharge beater 142 and an area of the field behind combine 100, respectively. These are examples only, and additional or different cameras can be used and/or they can be devices that capture still images or other visual data.

It will also be appreciated that sensor and measurement mechanisms (in addition to the sensors, cameras, etc. already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as it is being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
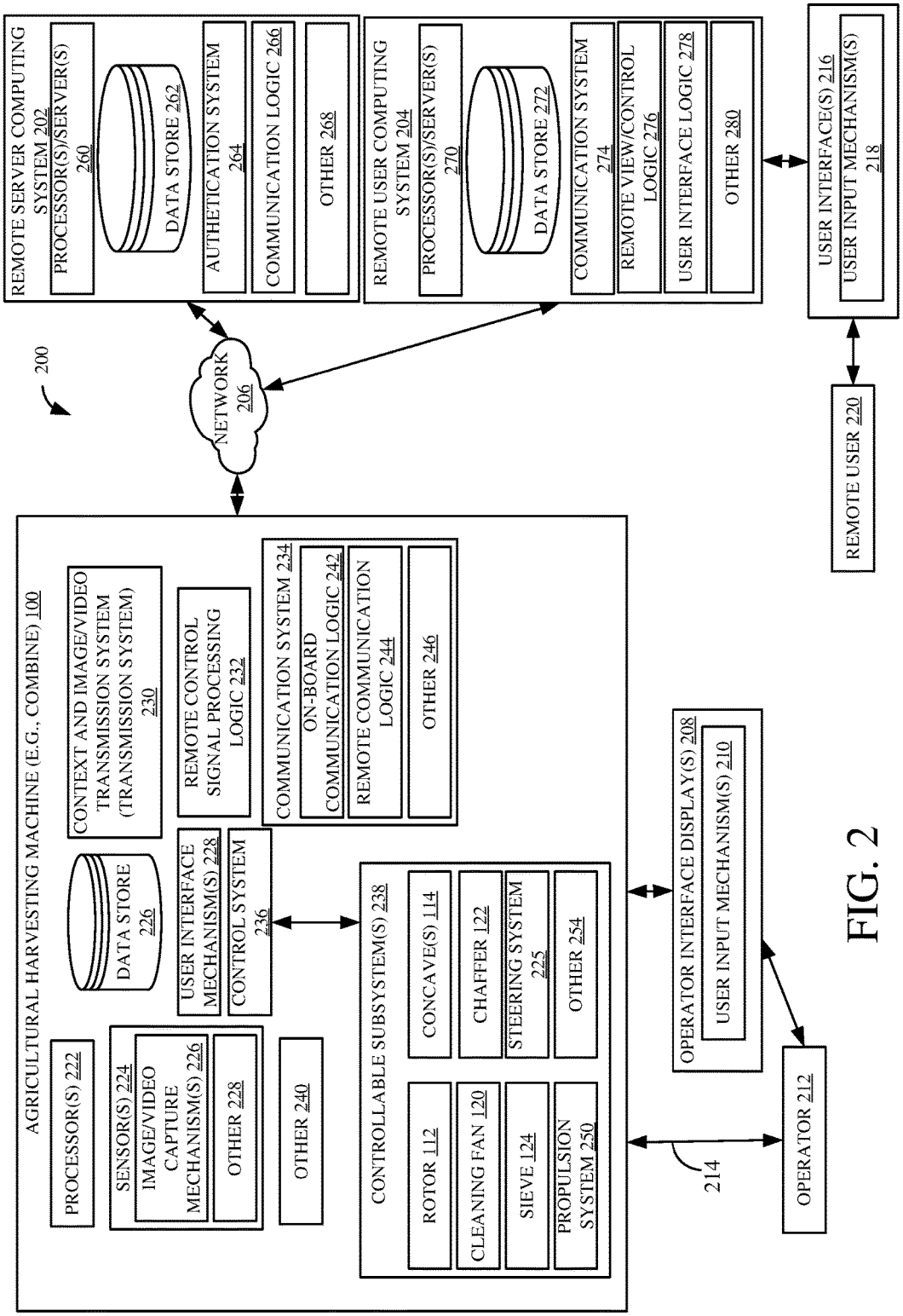
FIG. 2 is a block diagram of one example of a computing system architecture that includes the combine harvester illustrated in FIG. 1.

FIG. 2 is a block diagram showing one example of an architecture 200 that includes combine harvester 100 coupled for communication with remote server computing system 202 and remote user computing 204, over network 206. Network 206 can be any of a wide variety of different types of networks, such as a wide area network, a local area network, a near field communication network, a cellular network, or any of a wide variety of other networks or combinations of networks. As is discussed in greater detail below, combine harvester 100 can communicate with other systems using store-and-forward mechanisms as well. FIG. 2 also shows that, in one example, combine harvester 100 can generate operator interface displays 208 with user input mechanisms 210 for interaction by operator 212. Operator 212 is illustratively a local operator of combine 100, in the operator's compartment 101 of combine 100, and can interact with user input mechanisms 210 in order to control and manipulate combine harvester 100. In addition, as is described below, operator 212 can interact directly with other user interface mechanisms on combine harvester 100. This is indicated by arrow 214.

FIG. 2 also shows that, in one example, remote user computing system 204 illustratively generates user interfaces 216, with user input mechanisms 218, for interaction by remote user 220 (who may be a farm manager, a remote manager, or other remote user that has access to data corresponding to combine 100). Remote user 220 illustratively interacts with user input mechanisms 218 in order to control and manipulate remote user computing system 204, and, in some examples, to control portions of combine harvester 100 and/or remote server computing system 202.

In the example shown in FIG. 2, agricultural harvesting machine (e.g., combine) 100 includes one or more processors or servers 222, sensors 224, data store 226, user interface mechanisms 228, context and image/video transmission system (transmission system) 230, remote control signal processing logic 232, communication system 234, control system 236, controllable subsystems 238, and it can include a wide variety of other items 240. Communication system 234 can include on-board communication logic 242 (which, itself, can include such things as a controller area network (CAN) bus, a Wi-Fi network, an Ethernet network, or any of a wide variety of other wired or wireless communication systems or networks or combinations of networks), that is used to facilitate communication of items on board machine 100. Communication system 234 can also include remote communication logic 244 (which, itself, can include a cellular communication network, a satellite communication system, a store-and-forward communication system, a large area network communication system, or a wide variety of other wired or wireless communication systems or a combination of systems), that is used to facilitate communication with items remote from machine 100. Communication system 234 can include other items 246. Sensors 224 can include any of the sensors discussed above with respect to FIG. 1. By way of example, they can include image/video capture sensors 226 (which, themselves, can be any of the cameras 150, 154, 156, 158, or other video or image capture sensors), and they can include a wide variety of other sensors 228 (which may be any or all of the sensors discussed above and/or other sensors)).

User interface mechanisms 228 can include one or more display devices, audio devices, one or more haptic devices, and it can include other items, such as a steering wheel, one or more joysticks, pedals, levers, buttons, keypads, etc. Where the user interface mechanisms include a user interface display 208, then user input mechanisms 210 can include buttons, icons, actuatable links, or other items that can be actuated by operator 212. When the control system 236 or other items on machine 100 use speech recognition, and/or speech synthesis, then user interface mechanisms 228 can include a microphone, a speaker, etc.

Control system 236 can include logic and actuators or other items that can perform various types of processing and generate control signals to control controllable subsystems 238. The control signals can be generated based on user inputs, they can be generated automatically based on sensor inputs, based on detected events or otherwise. They can also be generated based on remote control inputs received from remote user computing system 204 and from remote control signal processing logic 232. Controllable subsystems 238 can illustratively include such things as rotor 112, concaves 114, cleaning fan 120, chaffer 122, sieve 124, a propulsion system 250, and a steering system 252. It can include a wide variety of other items 254 as well.

Context and image video transmission system 230 receives a request for context and video or image data, and obtains that information from image/video capture mechanisms 226 and other sensors 228, or other sources of context information. It generates a transmission message and transmits it to remote user system 204 through network 206. This is described in greater detail below.

Remote control signal processing logic 232 receives remote control signals over network 206, from remote user system 204. It processes those signals and provides them to control system 236. Control system 236 can then control the controllable subsystems 238 (or other items) based upon the signals received from remote control signal processing logic 232.

In the example shown in FIG. 2, remote server computing system 202 illustratively includes one or more processors or servers 260, data store 262, authentication system 264, communication logic 266, and it can include a wide variety of other items 268. Authentication system 264 can be used to authenticate different operators 212 or remote users 220, so that they can access resources available through remote server computing system 202. Communication logic 266 illustratively allows communication, over network 206, with both remote user system 204 and combine 100. It illustratively includes communication logic that enables communication of video or image information. It also illustratively includes context communication logic which enables communication of the context information discussed above.

Remote user computing system 204 can be a wide variety of different types of systems, such as a mobile device, a laptop computer, a desktop computer, etc. It illustratively includes one or more processors or servers 270, data store 272, communication system 274, remote view/control logic 276, user interface logic 278, and it can include a wide variety of other items 280.

Communication system 274 illustratively allows remote user computing system 204 to communicate with remote server computing system 202 and with combine 100 over network 206. Therefore, it can include one or more different communication systems, such as a cellular communication system, a satellite communication system, a wide area network communication system, a local area network communication system, a near field communication system, or a variety of other communication systems or combinations of systems.

Remote view/control logic 276 illustratively generates user interfaces 216 that include both the context information and the corresponding video or image data. It also illustratively generates a user interface with one or more user control inputs that remote user 220 can actuate in order to adjust the settings on combine 100 or to otherwise control combine 100. User interface logic 278 illustratively surfaces (or displays) the displays generated by logic 276 so that remote user 220 can view and control combine 100.

Figure 3:
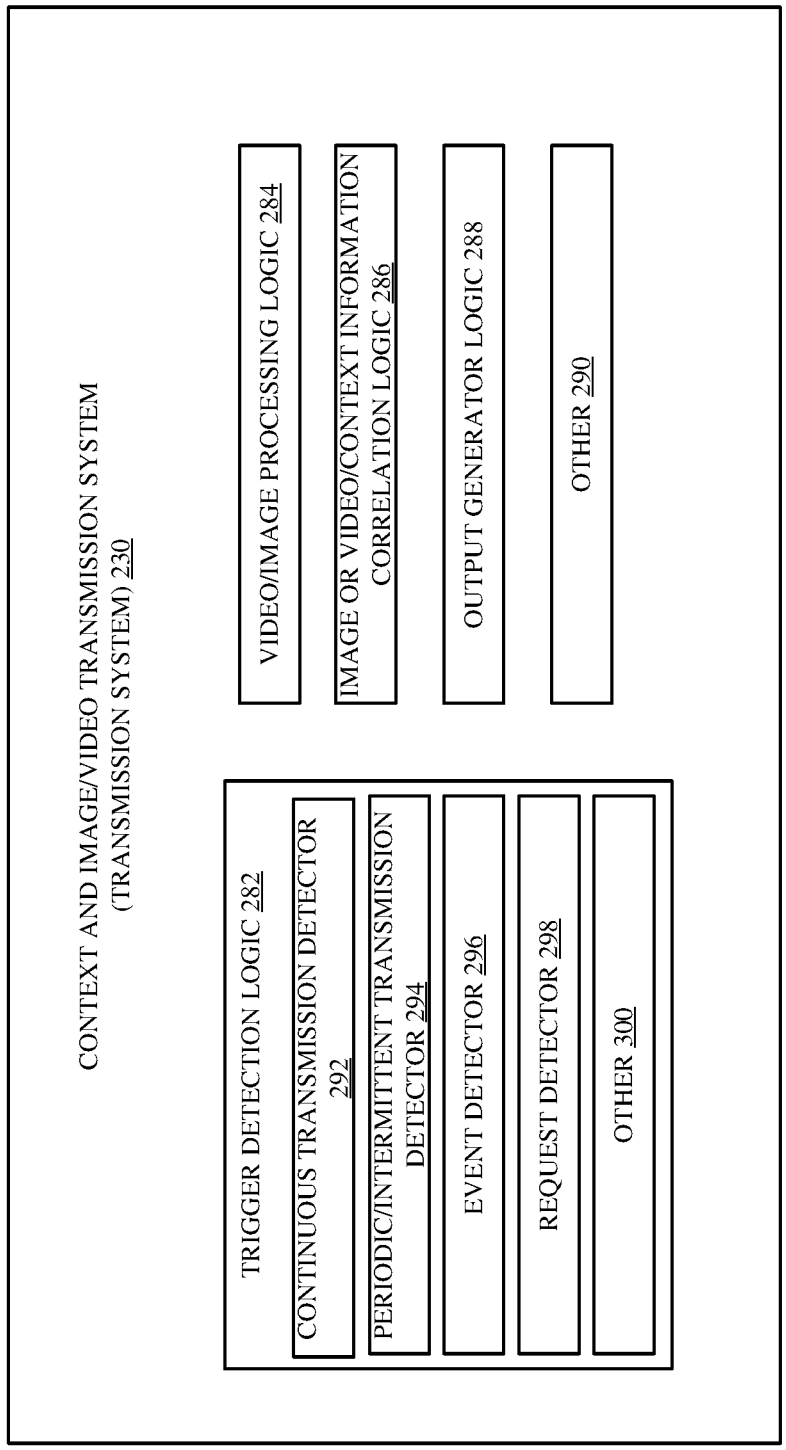
FIG. 3 is a block diagram showing one example of a context and image/video transmission system, in more detail.

FIG. 3 is a block diagram showing one example of transmission system 230 (on combine 100 in FIG. 2) in more detail. System 230 illustratively includes trigger detection logic 282, video/image processing logic 284, image or video/context information correlation logic 286, output generator logic 288, and it can include other items 290. Trigger detection logic 282, itself, can include continuous transmission detector 292, and periodic/intermittent transmission detector 294. Trigger detection logic 282 detects one or more different triggers that indicate that system 230 should obtain and send image or video data captured by image/video capture mechanisms 226, along with the corresponding context information, and generates a trigger signal to perform that process. Continuous transmission detector 290 detects an input or other indicator that indicates that the video/image and context data should be sent continuously in near real time, and generates the trigger signal indicating this. Periodic/intermittent transmission detector 294 detects an input indicating that the video or image and context data should be sent periodically, or intermittently, and generates the corresponding trigger signal. Event detector 296 detects events, and generates the corresponding trigger signal, which triggers the transmission of the information. For instance, it may be that system 230 is configured so that, every time an operator makes a settings change, this is detected by event detector 296. In response to the corresponding trigger signal, the context information indicative of that settings change, and the corresponding image or video information, is transmitted to remote user computing system 204. It can be sent continuously, in near real time, until another trigger is detected, or it can be sent in other ways. When events are detected indicating a setting change, event detector 296 can be configured to detect when settings are changed by the operator. Event detector 296 can be configured to detect a wide variety of other events as well.

Request detector 298 can be configured to detect when the video or image and corresponding context information is to be transmitted, on demand, based on a request from remote user 220, through remote user computing system 204. For instance, it may be that remote user 220 wishes to view the image or video and corresponding context information from one or more combines 100. In that case, remote view/control logic 276 (shown in FIG. 2) can surface a user interface for remote user 220 so that remote user 220 can select one or more different combines 100, and generate a request to view the image or video and corresponding context information for the selected combines. That request can be sent through network 206 (and possibly through remote server computing system 202) to transmission system 230, where request detector 298 detects it as a transmission trigger and generates the trigger signal.

In response to a transmission trigger being detected by logic 282, video/image processing logic 284 obtains video or image data from video or image capture mechanisms 226 (e.g., cameras 150, 154, 156, 158, etc.) and generates a message (or video transmission) that can be transmitted to remote user computing system 204 over network 206. In addition, image or video/context information correlation logic 286 identifies the particular context information that corresponds to the image or video information that is being processed and transmitted to remote user computing system 204.

For instance, it may be that a grain quality sensor has sensed that a relatively large amount of grain that is entering the clean grain tank of combine 100 is cracked or otherwise damaged. This can be done, for instance, by performing image processing on images taken by the camera 150 in the clean grain elevator. A grain quality metric can be generated that is indicative of the quality of the grain entering the clean grain tank, in terms of the amount of grain that is damaged. Therefore, it may be that remote user 220 has seen an decrease in the grain quality metric. In that case, remote user 220 may generate a request to see the sensor data corresponding to the grain quality metric, along with the video from camera 150 showing actual grain entering the clean grain tank. In this way, user 220 sees not only a numeric or graphical indicator that indicates the quality of the grain entering the clean grain tank, but also sees a video image showing that grain, in near real time.

Remote user 220 can then provide a control input to make adjustments to one of the controllable subsystems 238 in order to improve grain quality, or remote user 220 can communicate with operator 212 requesting that operator 212 make such an adjustment. Remote user 220 can then continue to monitor the video information from camera 150, along with the corresponding context information (e.g., the grain quality metric and the outputs of any other sensors that may correspond to, or relate to, the grain quality being harvested). Therefore, once an indication has been received that indicates the particular video or image information that is to be transmitted, correlation logic 286 then identifies the corresponding context information that is to be sent along with that image or video information. Output generator logic 288 illustratively generates an output containing the image or video information as well as the corresponding context information. That output can be sent to remote user computing system 204 through network 206, using communication system 234.

Figure 3A:
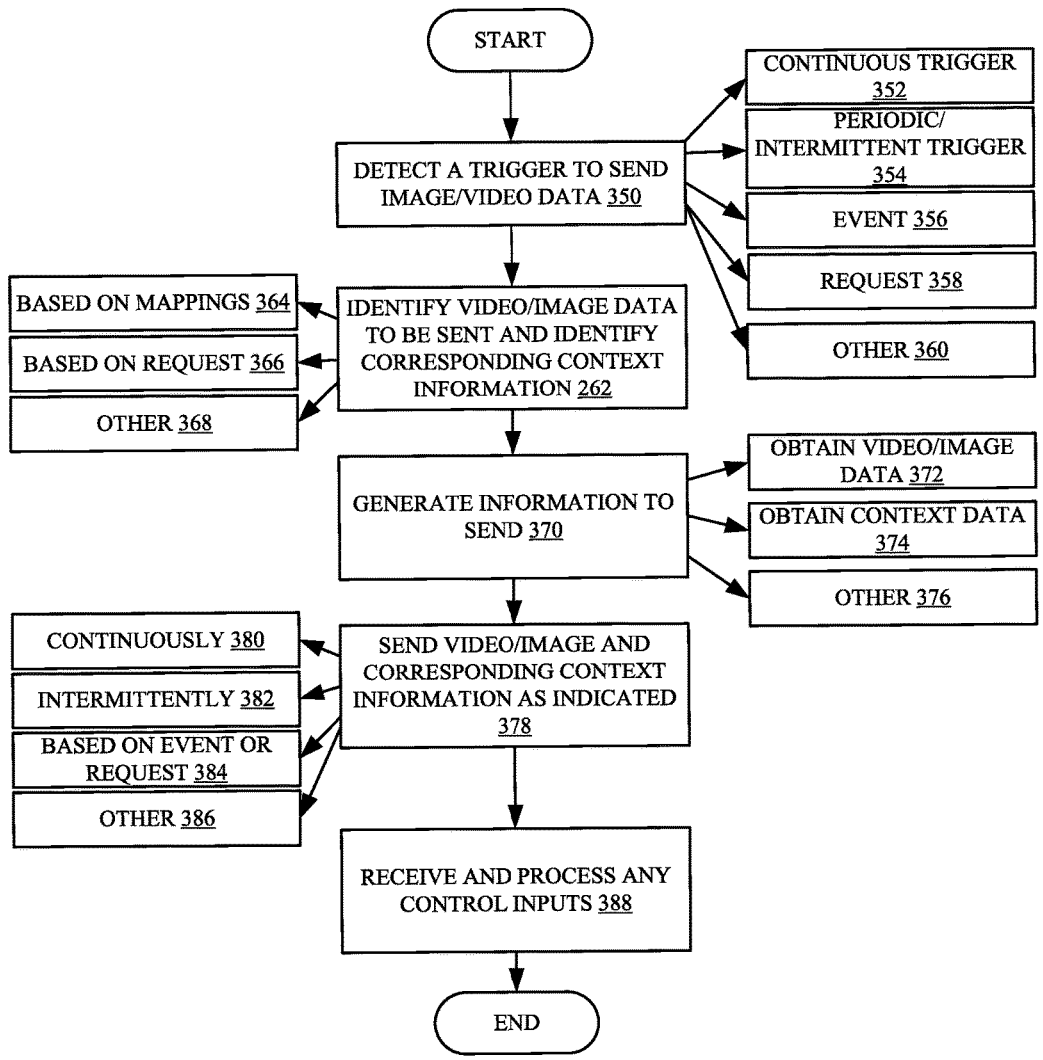
FIG. 3A is a flow diagram illustrating one example of the operation of the transmission system shown in FIG. 3.

FIG. 3A is a flow diagram illustrating one example of the operation of transmission system 230 in FIG. 3. It is first assumed that transmission system 230 is configured to detect a trigger to send video or image data in conjunction with its corresponding context data, to a remote user computing system 204. Therefore, trigger detection logic 282 first detects a trigger to send image and/or video data. This is indicated by block 350 in the flow diagram of FIG. 3A. Again, this can be any number of different triggers. Continuous transmission detector 292 may detect an input indicating that the image or video data should be sent continuously until otherwise triggered. This is indicated by block 352. Periodic/intermittent transmission detector 294 can detect an input indicating that it is time to send the video or image data. For instance, it may be that a timer is set and periodically, whenever the timer goes off, the video or image data is to be transmitted. In another example, it may be intermittent, but not periodic. Periodic/intermittent trigger detection is indicated by block 354.

Event detector 296 may detect an event that triggers the transmission of image or video data. For instance, if the operator of combine 100 suddenly changes speeds, if the yield of harvested crop suddenly drops or changes by an amount above a threshold amount, or if the operator has made a settings change, or any of a wide variety of other events occur, then event trigger detector 296 may detect a trigger indicating that video or image data is to be transmitted. This is indicated by block 356.

Request detector 298 may detect a request for video or image data from a remote user computing system 204. This is indicated by block 358. A wide variety of other triggers can be detected in other ways as well. This is indicated by block 360. Once the trigger has been detected, then video/image processing logic 284 identifies the particular video or image data that is to be sent, and correlation logic 286 identifies the corresponding context information that is to be sent along with the video or image data. Identifying the video or image data to be sent and the corresponding context information is indicated by block 362. This can be done by accessing a set of mappings that map context data to video or image data. This is indicated by block 364. The video or image data can be specifically requested in the request from a remote user computing system 204, and the context information can be specifically requested as well. Identifying the video or image data and the corresponding context information based on the request is indicated by block 366. The information can be identified in other ways as well. This is indicated by block 368.

Output generator logic 288 then generates an output indicative of the information to be sent. This is indicated by block 370. For instance, it can obtain the video or image data (or a live feed) from the cameras mentioned above. This is indicated by block 372. It can obtain context information from various sensors or other identifying mechanisms. This is indicated by block 374. It can generate information to send in other ways as well, and this is indicated by block 376.

Output generator logic 288 then begins sending the information through communication system 234 and network 206 to remote user computing system 204, as desired or indicated. This is indicated by block 278. For instance, it can send continuously streaming data as indicated by block 380. It can send an initial set of data, and then data updates intermittently, such as in bursts, periodically, or in other ways. This is indicated by block 382. It can send updated information based on other triggered events or requests received. This is indicated by block 384. It can send the video or image data and corresponding context information in other ways as well, and this is indicated by block 386.

Remote control signal processing logic 232 also illustratively receives and processes any control inputs. This is indicated by block 388. For instance, if remote user 220 sends a control input to change the settings on combine 100, or to remotely control it in other ways, this is received and processed by logic 232.

Figure 4:
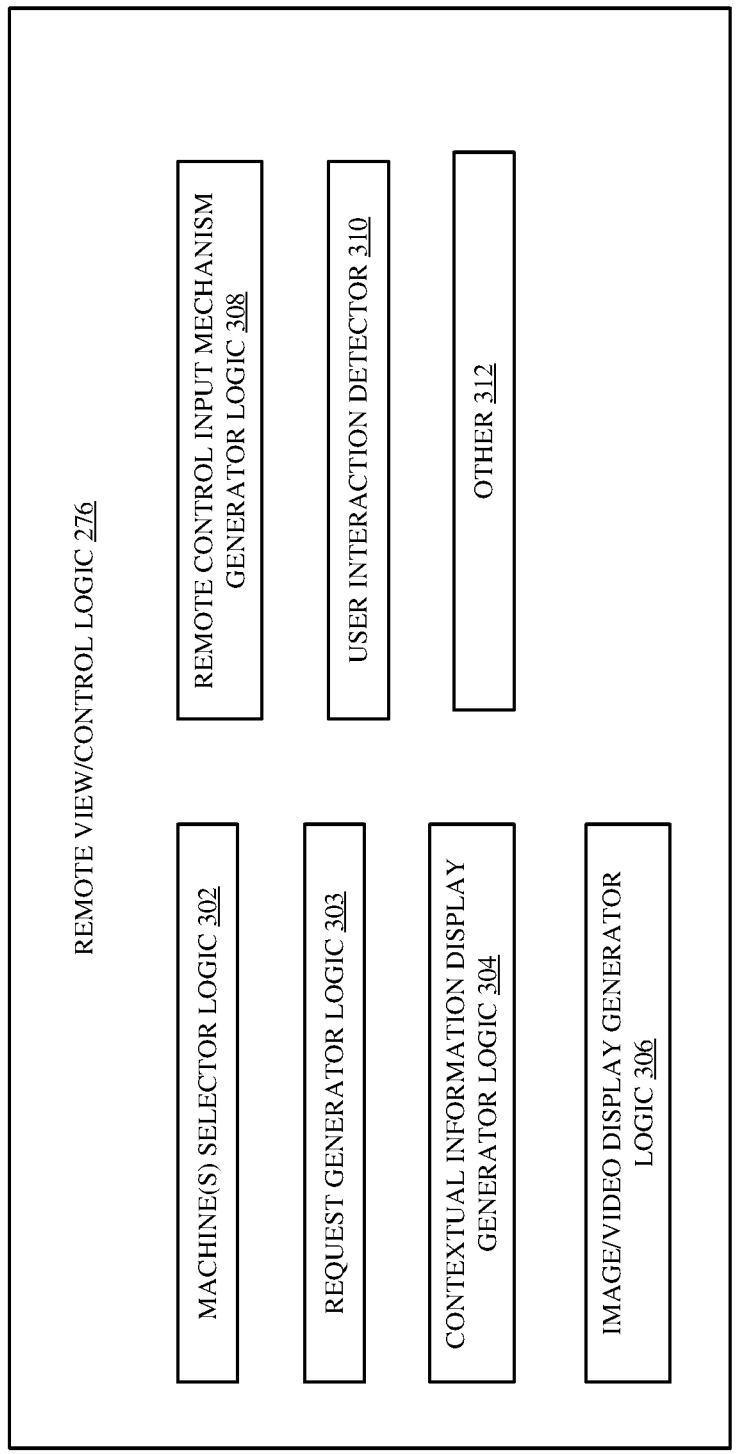
FIG. 4 is a block diagram showing one example of remote view/control logic, in more detail.

FIG. 4 is a block diagram showing one example of remote view/control logic 276 (shown on remote user computing system 204 in FIG. 2). In the example shown in FIG. 4, logic 276 illustratively includes machine selector logic 302, contextual information display generator logic 304, image/video display generator logic 306, remote control input mechanism generator logic 308, user interaction detector 310, and it can include a wide variety of other items 312.

Machine selector logic 302 can generate a user interface mechanism that can be actuated by remote user 220 in order to select one or more combines from which image or video and corresponding context information is to be obtained and displayed. For instance, it can access remote server computing system 202 to identify the particular machines that remote user 220 has access to, after remote user 220 has authenticated to remote server computing system 202 through authentication system 264. Once the machines that remote user 220 has access to have been identified, then machine selector logic 302 can generate a user interface display, with a user input mechanism that allows remote user 220 to select one or more of those machines for which a display is to be generated. Based upon the user inputs, request generator logic 303 then generates a request for image or video and corresponding context information from the selected combines 100. The request can be sent through remote server computing system 202, so that the request can be authenticated and authorized and then sent on to the selected combines 100, or it can be sent directly to those combines.

Contextual information display generator logic 302 illustratively receives the response that includes the context information. It generates a display element showing the contextual information that corresponds to the image or video information that is to be displayed. Image/video display generator logic 306 illustratively receives the image or video information and generates a display corresponding to that information. Thus, a user interface display can be provided to remote user 220, through a display device on remote user computing system 204, that shows the image or video information, along with the corresponding context information.

Remote control input mechanism generator logic 308 illustratively generates a remote control user input mechanism that can also be displayed or otherwise surfaced to the user, and actuated by remote user 220. User interaction detector 310 illustratively detects user interaction with the user interface display so that appropriate actions can be taken. For instance, it may be that remote user 220 makes another request to see video or image and corresponding context information from a different combine, or to see different image or video and corresponding context information from the same combine or combines. That interaction is detected by detector 310 so that request generator logic 303 can generate the appropriate request. In addition, it may be that remote user 220 interacts with the control input mechanism on the user interface display in order to adjust settings on combine 100, or to otherwise remotely control combine 100. In that case, user interaction detector 310 detects that interaction and provides it to request generator logic 302 which generates a control output that is transmitted to remote control signal processing logic 232 on the combine 100 that is to be remotely controlled or adjusted.

Figure 4A:
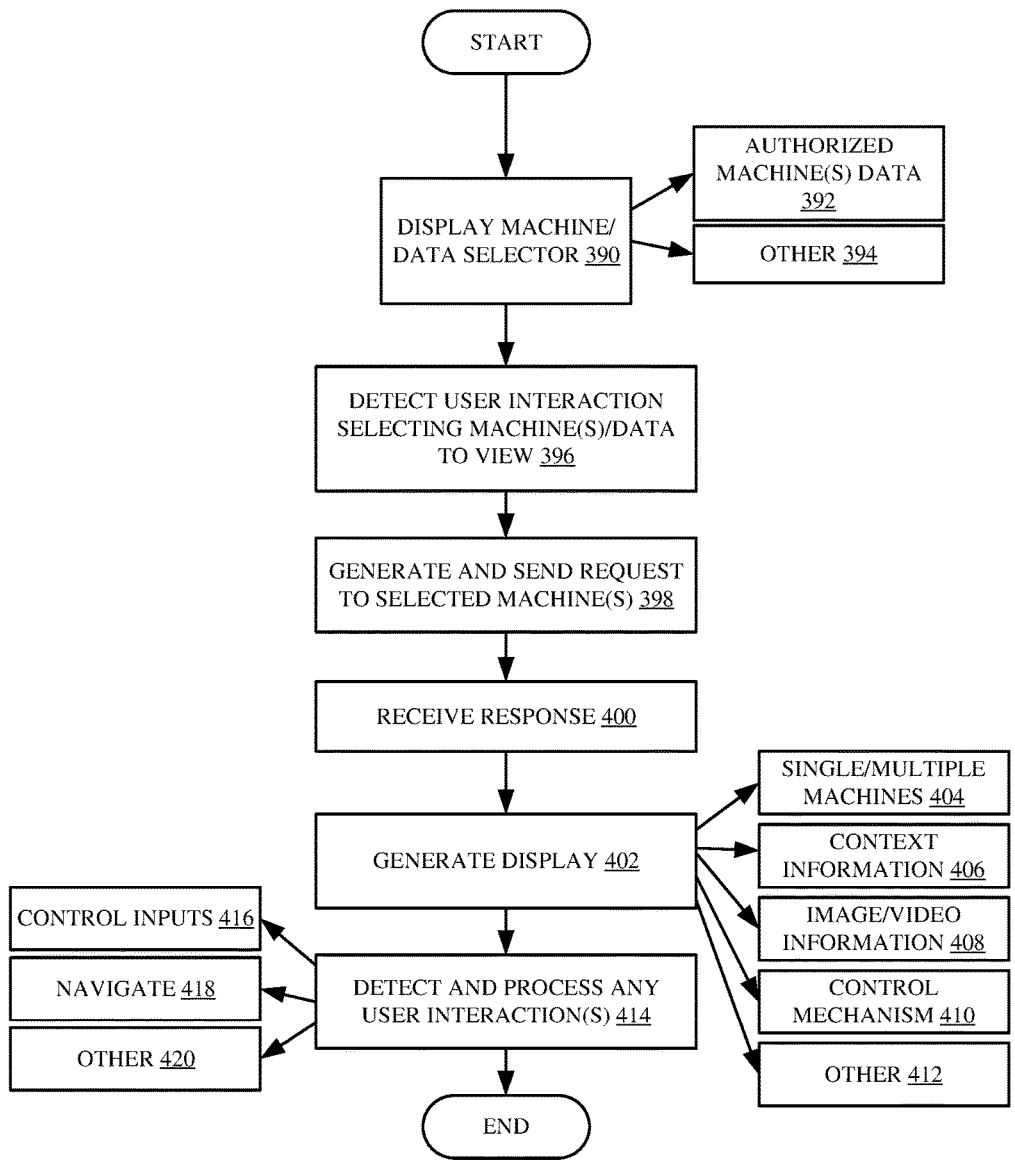
FIG. 4A is a flow diagram illustrating one example of the operation of the logic shown in FIG. 4.

FIG. 4A is a flow diagram illustrating one example of the operation of remote view/control logic 276, that resides on remote user computing system 204, in more detail. It is first assumed that remote operator 220 has authenticated himself or herself to remote user computing system 204 and/or to remote server computing system 202. At some point, remote user 220 will wish to see video or image data, and corresponding context information, from one or more harvesting machines. In that case, in response to a user input, machine selector logic 302 illustratively displays a machine and/or data selector that can be actuated by remote user 220 to select one or more machines, and to select the type of data to be displayed. This is indicated by block 390 in the flow diagram of FIG. 4A. In one example, machine selector logic 302 accesses remote server computing system 202 to identify which particular machines and data remote user 220 is authorized to see and control remotely. Displaying a selector for selecting authorized machines and authorized data is indicated by block 392. The machine and data selector can be displayed in other ways as well, and this is indicated by block 394.

User interaction detector 310 then detects user interaction with the machine/data selector. This interaction illustratively identifies the particular machine or machines for which data is to be viewed, and the particular data that is to be obtained from that set of machines, and to be displayed to remote user 220. Detecting the user interaction selecting machines and data to view is indicated by block 396.

Based on that information, request generator logic 303 generates and sends a request to the selected machine(s), for the identified data. This is indicated by block 398.

Contextual information display generator logic 304 and image/video display generator logic 306 then receive a response to the request and generate a display of the image or video information and the corresponding context information. Receiving the response and generating the display is indicated by blocks 400 and 402, respectively, in the flow diagram of FIG. 4A. It will be noted that the data received and displayed can be for a single machine, or for multiple different machines. This is indicated by block 404. The display can include the context information as indicated by block 406 and the video or image data as indicated by block 408.

Remote control input mechanism generator logic 308 also illustratively generates a remote control input mechanism that is displayed and that can be actuated by remote user 220 to perform the remote settings adjustment or remote control of machine 100. This is indicated by block 410. The display can be generated in other ways, with other display elements or actuators. This is indicated by block 412.

User interaction detector 310 then detects and processes any user interactions with the display. This is indicated by block 414. For instance, remote user 220 may interact with the control input to perform a control operation on one or more of the machines. This is indicated by block 416. Remote operator 220 may interact with a navigation input navigating the user to a different display or to drill down into the more detailed information about the display shown or to navigate in other ways. This is indicated by block 418. The user interaction can be detected in other ways as well. This is indicated by block 420.

Figure 5:
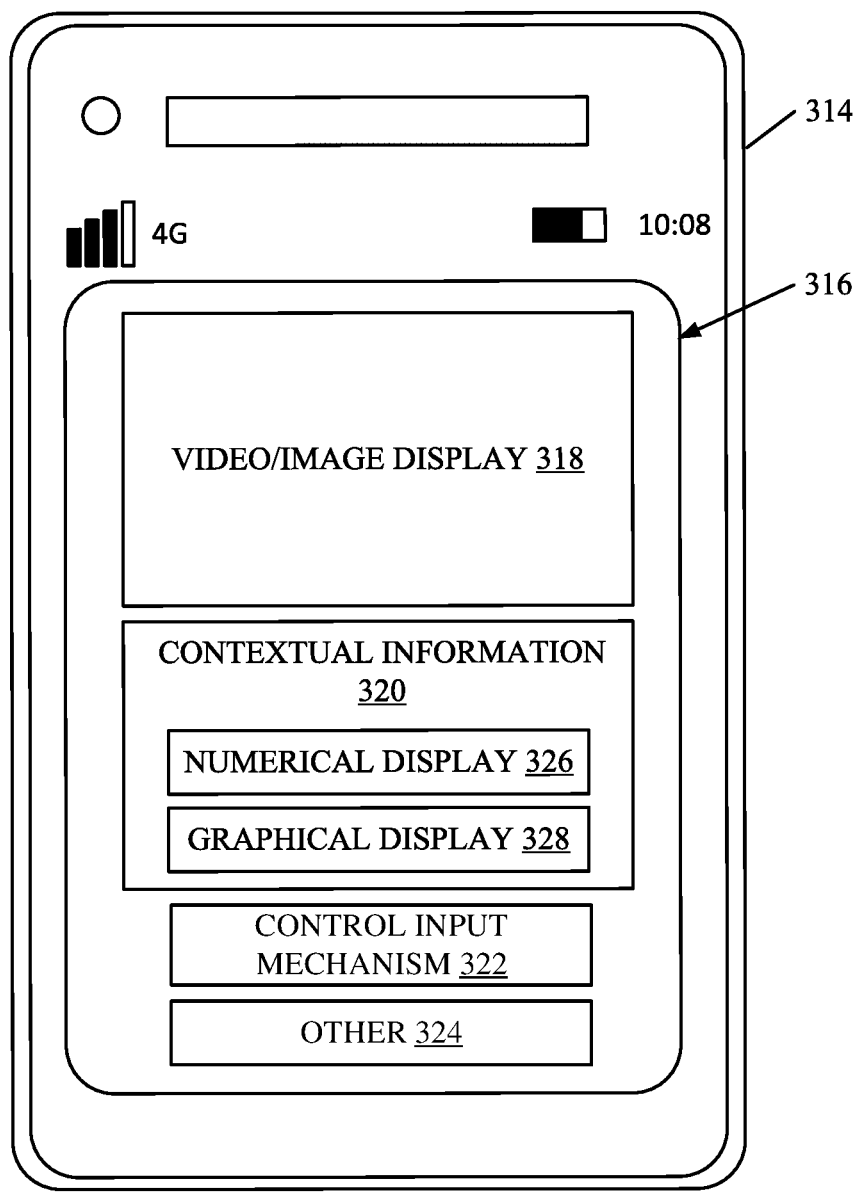
FIG. 5 is a block diagram showing one example of a mobile device (remote user computing system) with a control and monitor user interface display that can be generated on the mobile device.

FIG. 5 shows one example of a mobile device 314 that can include remote user computing system 204. Mobile device 314 illustratively includes a display screen that generates a user interface display 316. User interface display 316 illustratively includes a video/image display portion 318, a contextual information display portion 320, a control input mechanism 322, and it can include a wide variety of other items 324. The video/image display portion 318 illustratively displays the video or image information while contextual information display portion 320 displays the corresponding context information. In the example shown in FIG. 5, the contextual information display portion 320 is shown generating a numerical display 326 and a graphical display 328, although it can generate a wide variety of other displays. Control input mechanism 322 can be a mechanism that is actuated by remote user 220 in order to directly change a setting or to otherwise control the selected combine, or it can be an actuator that navigates the user to another user interface where additional control input mechanisms are provided to control different portions of combine 100.

Figure 6:
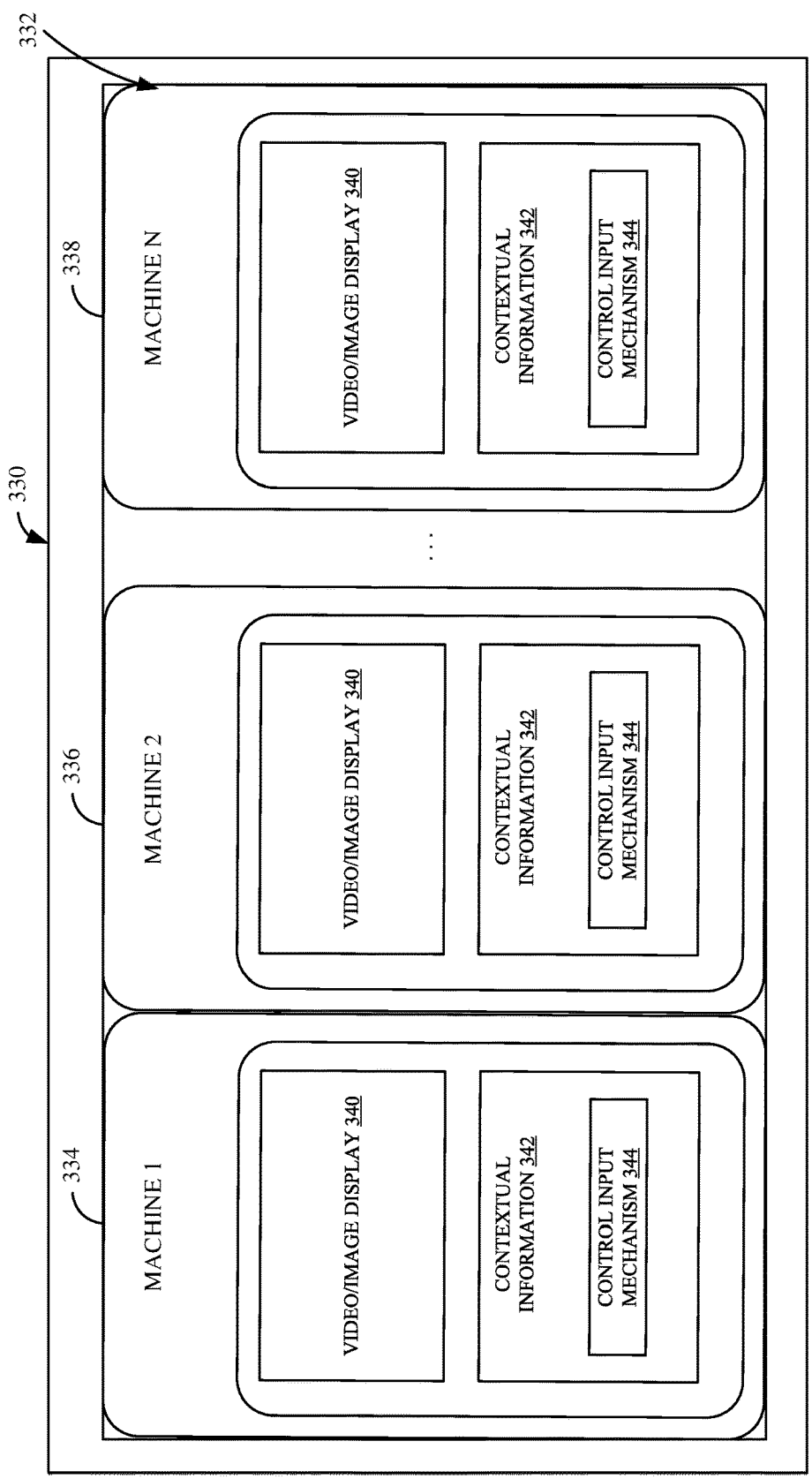
FIG. 6 shows one example of a multiple machine display that can be generated on the remote user computing system.

FIG. 6 shows another example of a user interface that can be generated. In FIG. 6, a computing device 330 can include, for instance, a desktop computer, a laptop computer, a tablet computer, etc. It includes a display screen that generates a user interface display 332 that shows video or image, and corresponding context information, from a plurality of different combines. For instance, where remote user 220 has provided inputs selecting a plurality of different combines 100, then a user interface display can be generated corresponding to each of the selected combines. In the example shown in FIG. 6, user interface display 332 illustratively includes a plurality of different machine display portions 334, 336, and 338, each of which display video and image information, along with corresponding context information, for a different machine. Display portion 334 illustratively includes video/image display portion 340 that shows video or image information for a first machine, along with a context information display portion 342 that displays corresponding context information. Display portion 334 also illustratively includes a control input mechanism 344 that can be actuated in order to make a settings adjustment, or to otherwise control the first machine. Display portions 336 and 338 illustratively include similar display portions, but for information obtained from different machines. It will also be noted that display portions 336 and 338 can display different video or image information and different context information for the different machines, or it can display information similar to that displayed for the first machine in display portion 334. All of these and other configurations are contemplated herein.

Figure 7:
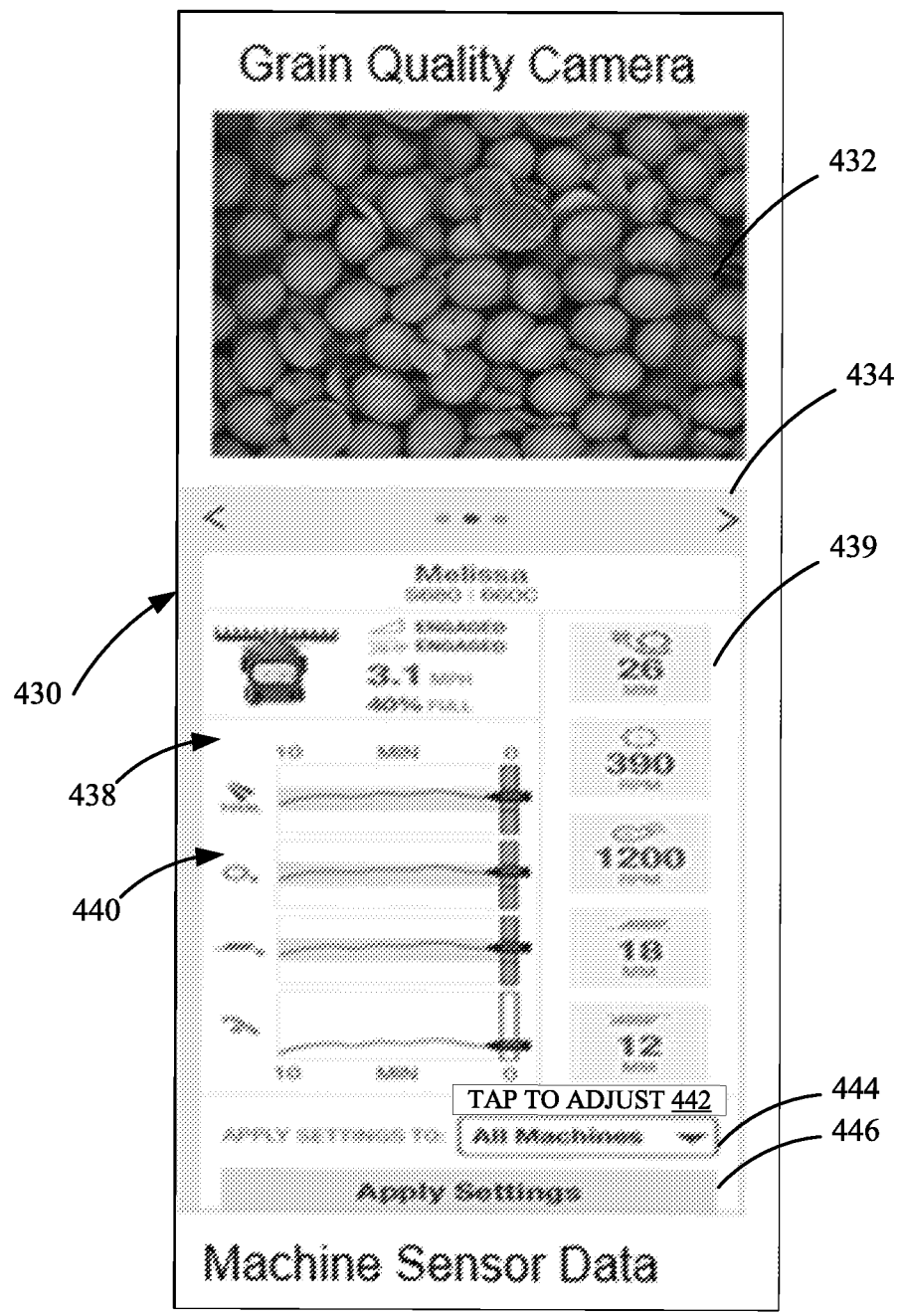
FIGS. 7 and 8 show additional examples of control and monitor user interface displays that can be generated on the remote user computing system.
Figure 8:
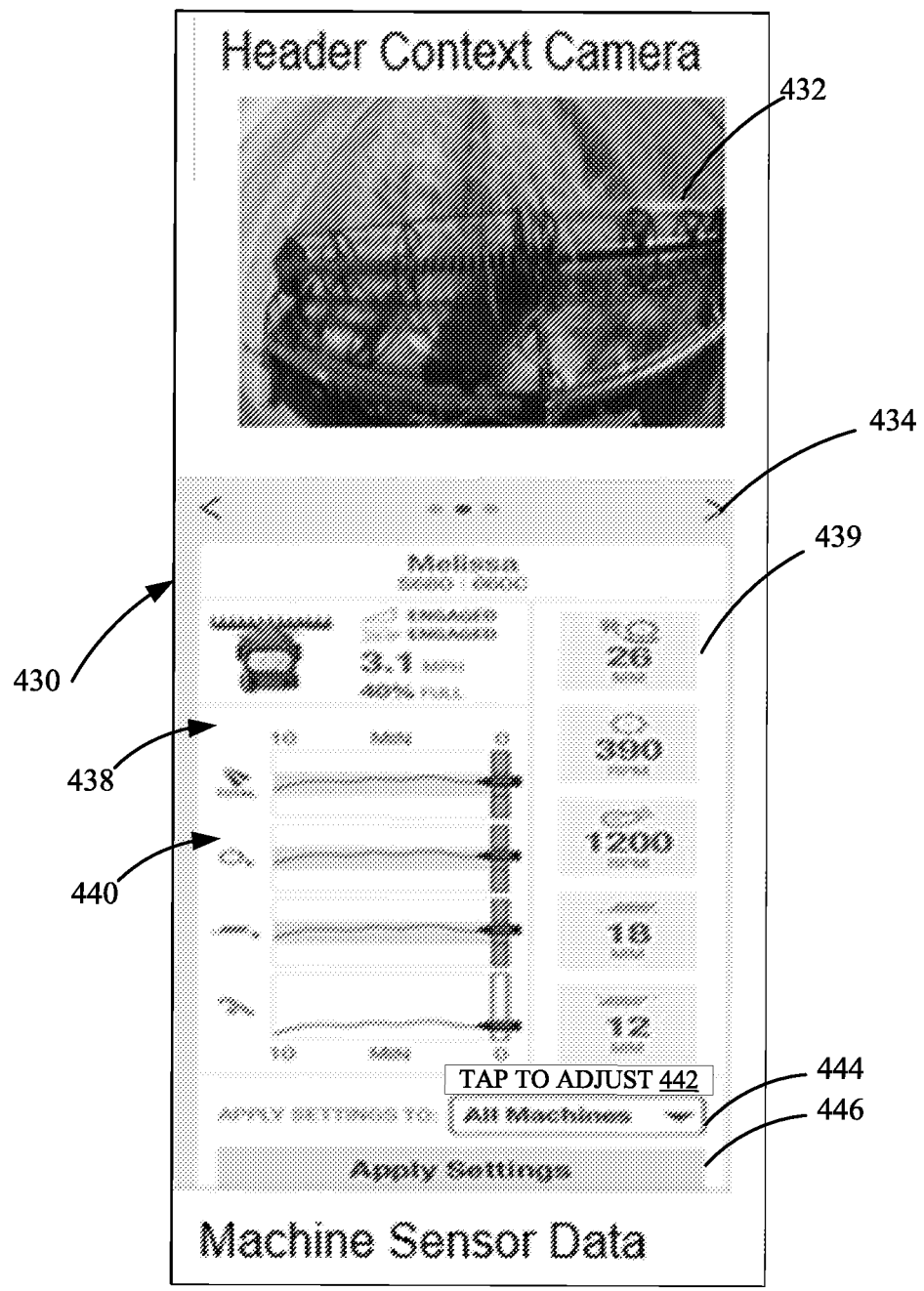

FIGS. 7 and 8 show two other examples of user interface displays that can be generated on remote user computing system 204. For instance, FIG. 7 shows a user interface display 430 that can be generated on a mobile device. Display 430 illustratively includes a video display portion 432 that shows live streaming video information generated from the clean grain camera 150 on combine 100. It also illustratively includes a machine selector 434 that can be used to scroll to different machines, or to different cameras on the same machine. Context information display portion 438 displays context information corresponding to the information generated by the clean grain camera 150. For instance, it includes a current settings portion 439 that shows values corresponding to current settings on machine 100. It also illustratively includes a historic display portion 440 that shows historic values (for the recent history) for the various settings. In addition, it includes a control actuator 442 that can be actuated to navigate the user to another user interface display with user input mechanisms that can be used to change the settings displayed in current setting display portion 349. It further includes a machine selector 444 and an "apply" actuator 446. Machine selector 444 can be actuated to select the different machines to which the adjusted settings are to be applied, and the "apply" actuator 446 is actuated to generate and send the control input to the selected machines, so that the adjusted settings can be applied to those machines.

FIG. 8 is similar to FIG. 7, except that the remote user 220 has now actuated selector 434 to change the video or image information that is displayed so that the video image that is now being live streamed (or otherwise transmitted in near real time) to remote user computing system 204 is video from the forward facing camera 156 on combine 100. It can be seen in FIG. 8 that the context information displayed has not changed, although, in another example, the context information may change when the video information is changed.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
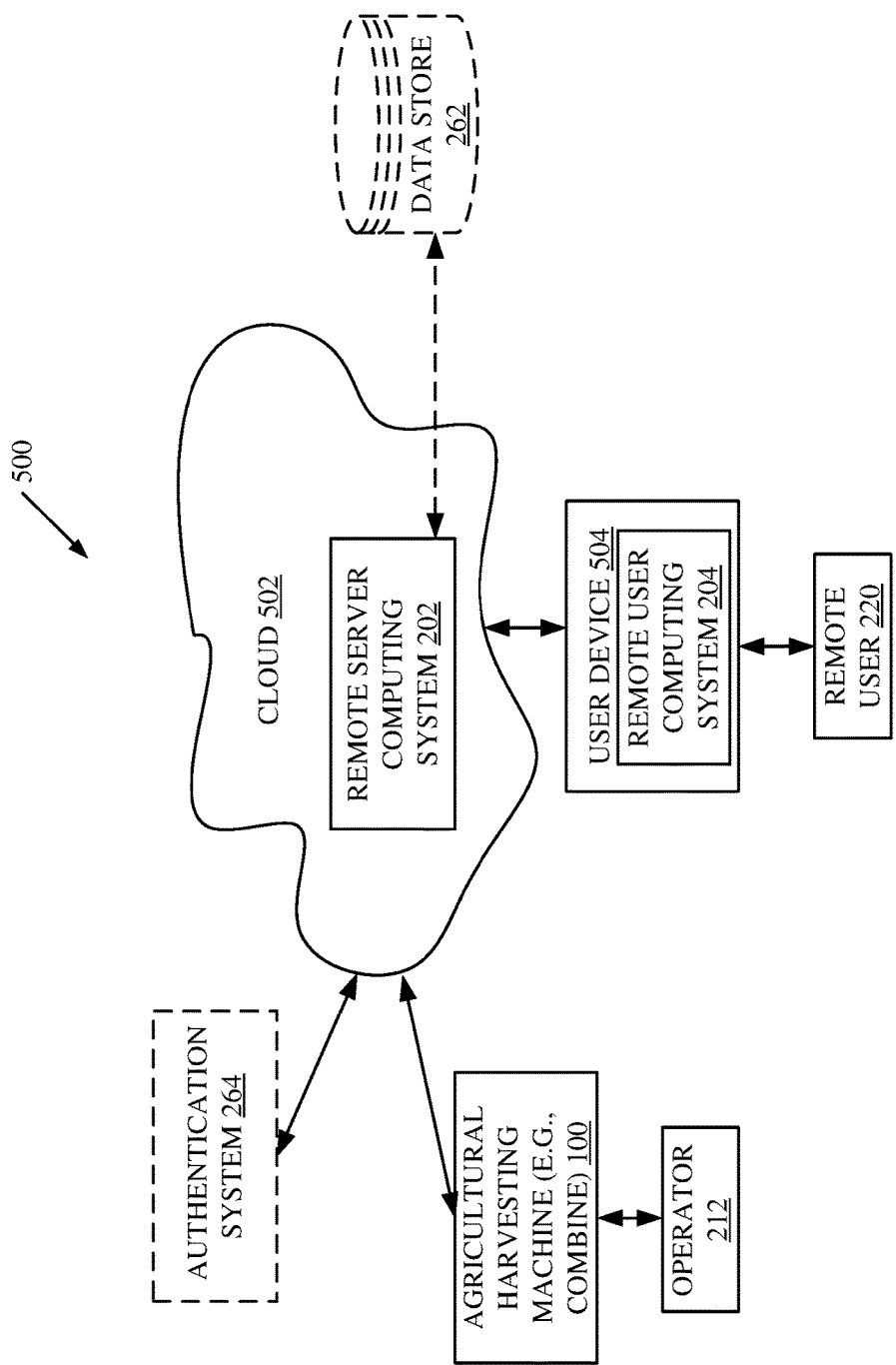
FIG. 9 shows one example of the architecture illustrated in FIG. 2, deployed in a remote server architecture.

FIG. 9 is a block diagram of the architecture, shown in FIG. 2, except that harvester 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1 and 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in FIGS. 1 and 2 and they are similarly numbered. FIG. 9 specifically shows that remote server computing system 202 can be located at a remote server location 502. Therefore, harvester 100 accesses those systems through remote server location 502.

FIG. 9 also depicts another example of a remote server architecture. FIG. 9 shows that it is also contemplated that some elements of FIG. 2 are disposed at remote server location 502 while others are not. By way of example, data store 262 or authentication system 264 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
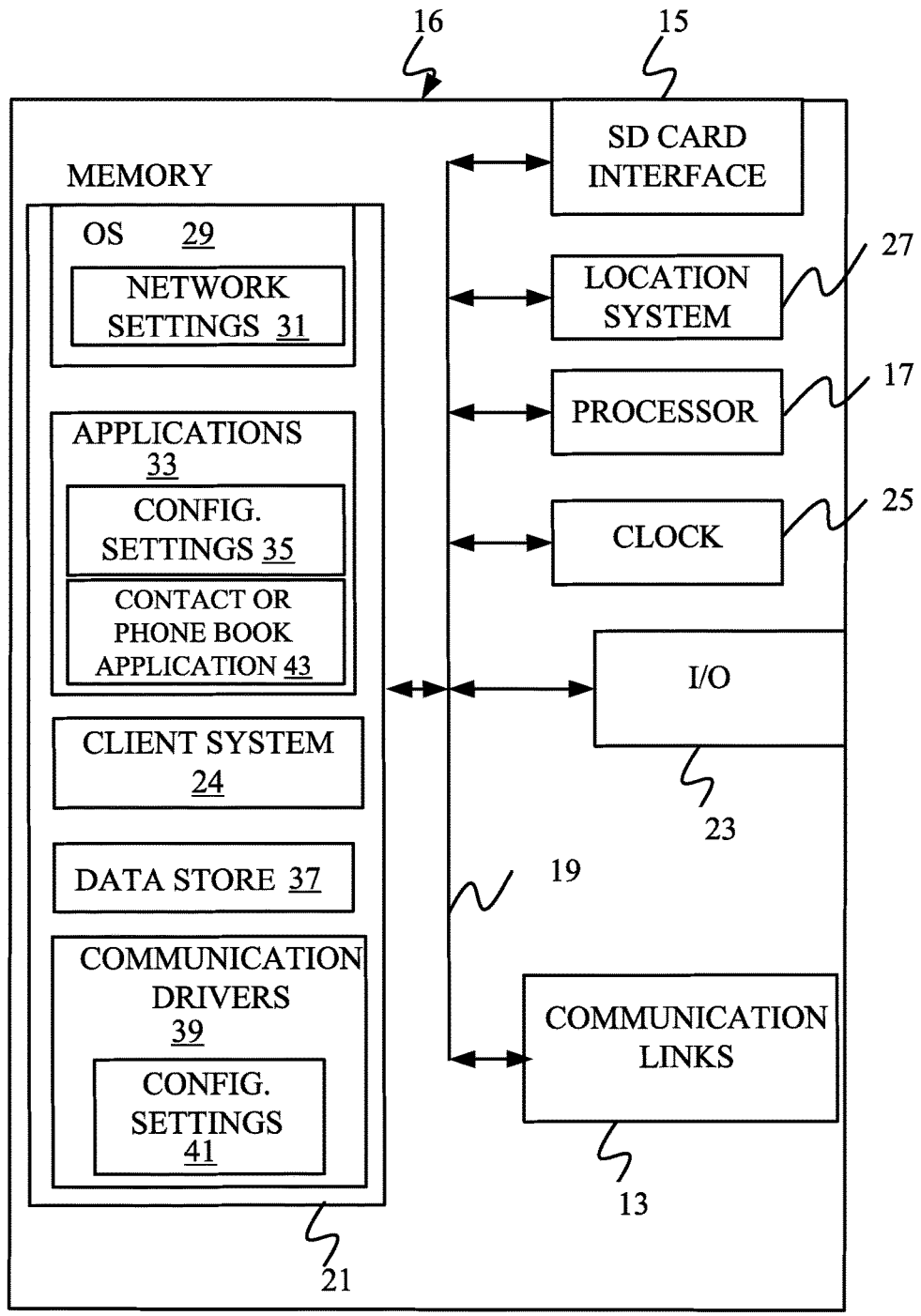
FIGS. 10-12 show examples of mobile devices that can be used in the architectures shown in the previous figures.
Figure 11:
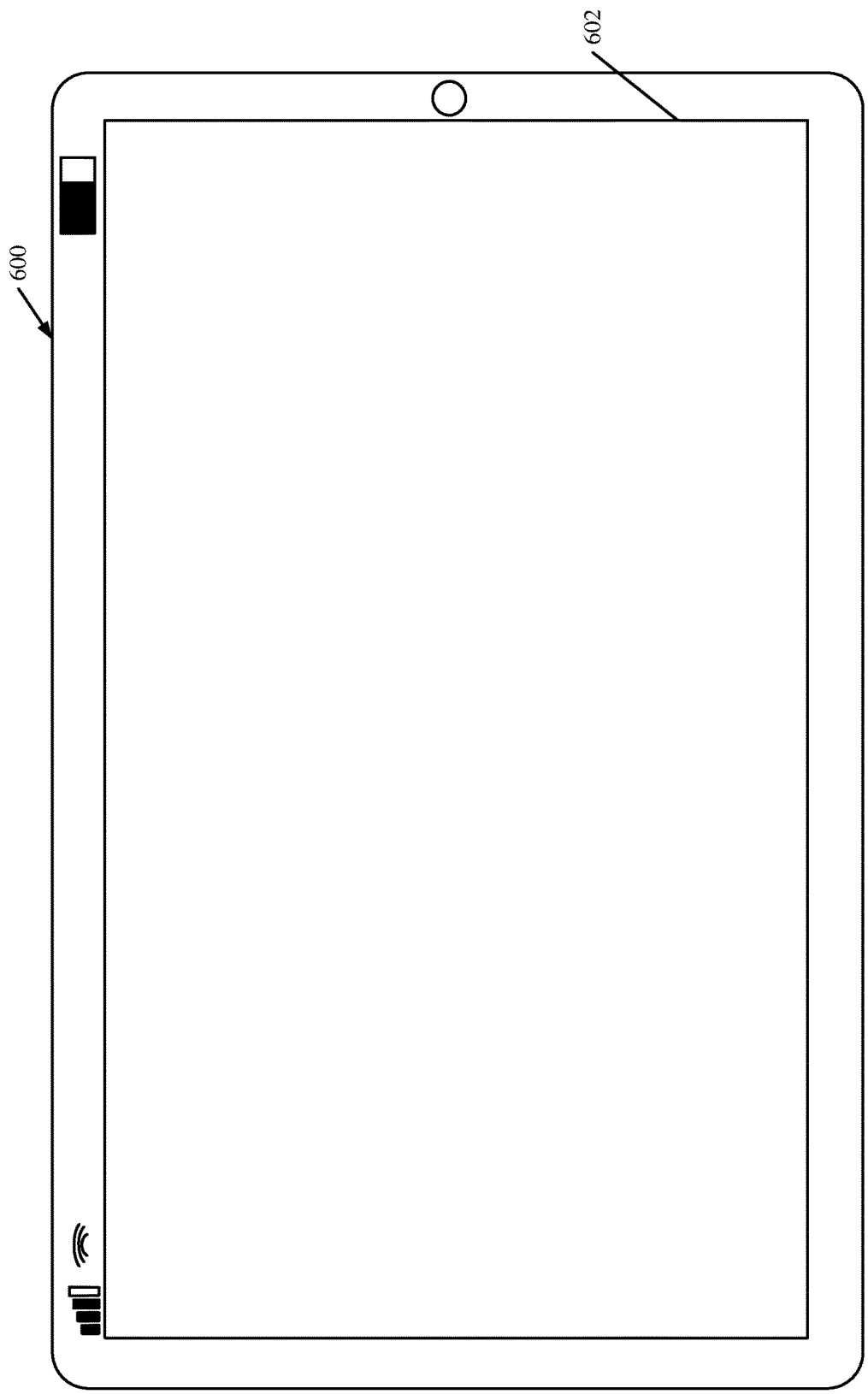
Figure 12:
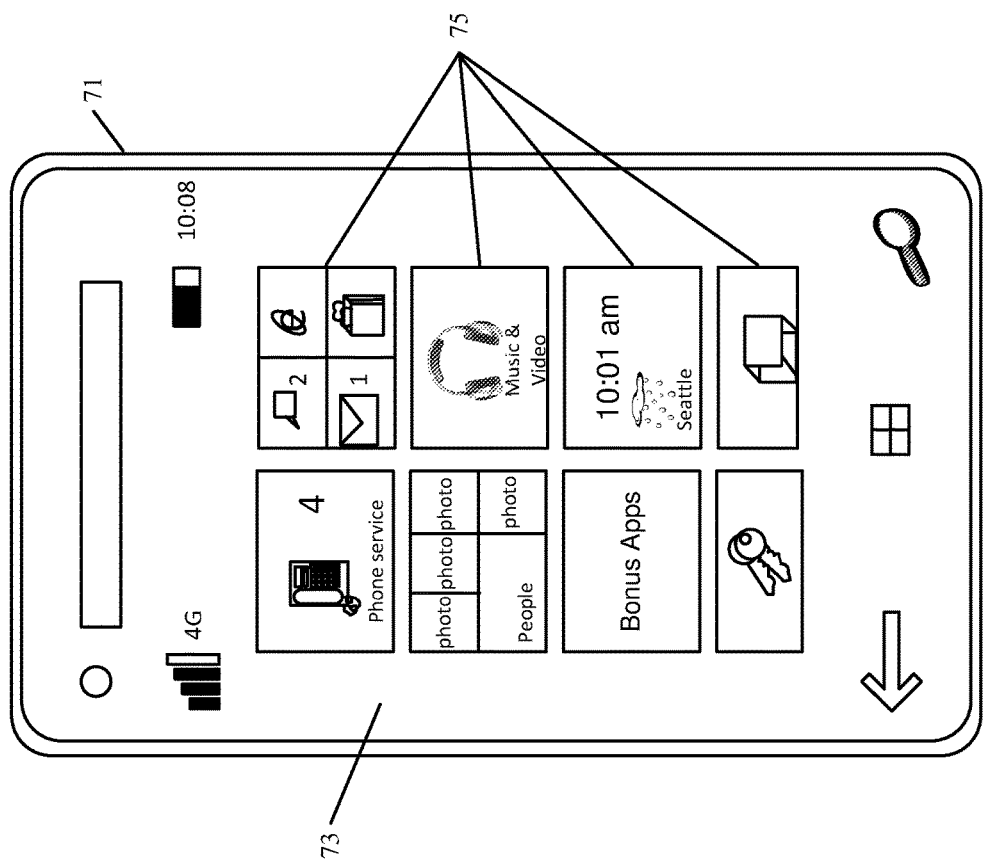

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 or that can be used as remote user computing system 204. FIGS. 11-12 are examples of handheld or mobile devices.

FIG. 10 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from other FIGS.) along a bus 19 that is also connected to memory 21 and input/output (I/O) components 23, as well as clock 25 and location system 27.

I/O components 23, in one examples, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 600. In FIG. 11, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
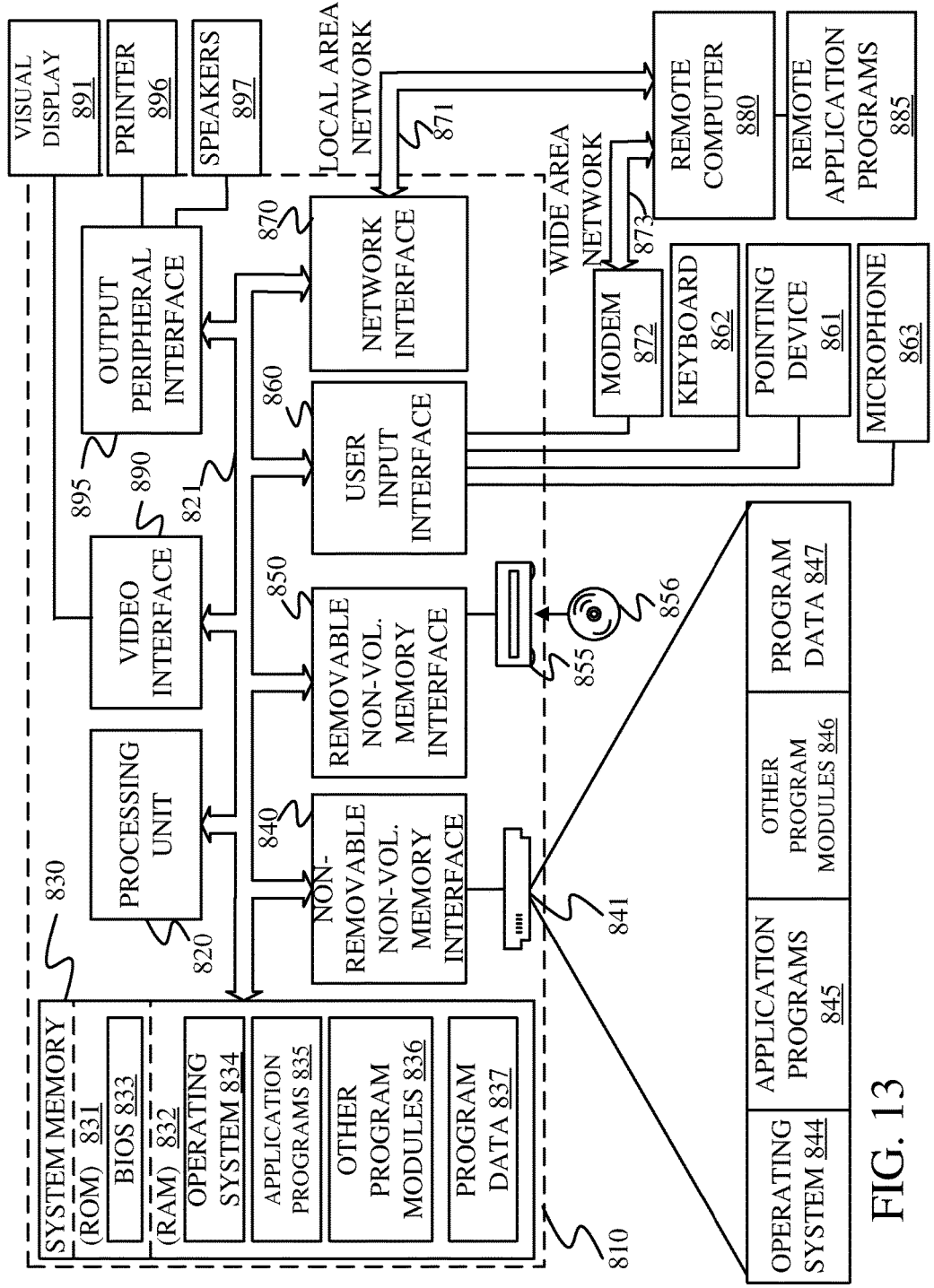
FIG. 13 is a block diagram showing one example of a computing environment that can be used in the architectures shown in the previous figures.

FIG. 13 is one example of a computing environment in which elements of FIG. 2, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880. When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880. It should also be noted that the different examples described herein can be combined in different ways. That is, parts of one or more examples can be combined with parts of one or more other examples. All of this is contemplated herein.

Example 1 is an agricultural harvesting machine, comprising:
a visual information capture mechanism that captures visual information;
context information correlation logic that identifies context information corresponding to the visual information;
output generator logic configured to generate an output including the context information and corresponding visual information; and
a transmission system that transmits the output to a remote computing system, remote from the agricultural harvesting machine, for display of the context information and the corresponding visual information.

Example 2 is the agricultural harvesting machine of any or all previous examples wherein the visual information capture mechanism comprises:
a plurality of video cameras mounted on the agricultural harvesting machine and each capturing video information.

Example 3 is the agricultural harvesting machine of any or all previous examples wherein first context information corresponds to the video information from a first of the plurality of video cameras and second context information corresponds to the video information from a second of the plurality of video cameras, the first context information being different from the second context information.

Example 4 is the agricultural harvesting machine of any or all previous examples and further comprising:
a plurality of sensors each generating a sensor signal indicative of a sensed variable; and
a control system generating the context information based on the sensor signals.

Example 5 is the agricultural harvesting machine of any or all previous examples and further comprising:
trigger detection logic configured to detect a trigger indicative of when the output including the context information and corresponding video information is to be transmitted to the remote computing system and generating a trigger signal identifying the video information based on detection of the trigger.

Example 6 is the agricultural harvesting machine of any or all previous examples wherein the trigger detection logic comprises:
a request detector detecting a request from the remote computing system, the request identifying which video information is to be transmitted.

Example 7 is the agricultural harvesting machine of any or all previous examples wherein the correlation logic is configured to identify the corresponding context information, that corresponds to the identified video information, for transmission with the identified video information.

Example 8 is the agricultural harvesting machine of any or all previous examples wherein the trigger detection logic comprises:
a continuous transmission detector generating the trigger signal indicating that the video information and corresponding context information is to be sent continuously, the transmission system being configured to continuously transmit the identified video information and corresponding context information to the remote computing system based on the trigger signal.

Example 9 is the agricultural harvesting machine of any or all previous examples wherein the trigger detection logic comprises:
an event detector detecting an event and generating the trigger signal indicating that the video information and corresponding context information is to be sent to the remote computing system based on the detected event, the transmission system being configured to continuously transmit the identified video information and corresponding context information to the remote computing system based on the trigger signal.

Example 10 is a method of controlling an agricultural harvesting machine, comprising:
capturing video information using a video capture mechanism on the agricultural harvesting machine;
generating a sensor signal indicative of a sensed variable;
identifying context information, based on the sensor signal, corresponding to the video information;
generating an output including the context information and corresponding video information; and
transmitting the output to a remote computing system, remote from the agricultural harvesting machine, for display of the context information and the corresponding video information.

Example 11 is the method of any or all previous examples wherein capturing video information comprises:
capturing video information from each of a plurality of different video cameras mounted on the agricultural harvesting machine.

Example 12 is the method of any or all previous examples wherein identifying context information comprises:
identifying first context information corresponding to the video information from a first of the plurality of different video cameras; and
identifying second context information corresponding to the video information from a second of the plurality of video capture mechanisms, the first context information being different from the second context information.

Example 13 is the method of any or all previous examples wherein generating a sensor signal comprises:
generating a plurality of different sensor signals, each indicative of a different sensed variable; and
generating the context information based on the plurality of different sensor signals.

Example 14 is the method of any or all previous examples and further comprising:
detecting a request from the remote computing system; and
identifying, based on the request, which video information is to be transmitted, wherein identifying context information includes identifying the corresponding context information, that corresponds to the identified video information, for transmission with the identified video information.

Example 15 is the method of any or all previous examples wherein transmitting the output to the remote computing system comprises:
continuously transmitting the identified video information and corresponding context information to the remote computing system.

Example 16 is the method of any or all previous examples and further comprising:
detecting an event; and
identifying which video information and corresponding context information is to be sent to the remote computing system based on the detected event, wherein transmitting comprises continuously transmitting the identified video information and corresponding context information to the remote computing system based on the detected event.

Example 17 is a mobile device, comprising:
machine selector logic that displays a user actuatable machine selection element that is actuatable to select a remote agricultural harvesting machine, that is remote from the mobile device;
a communication system that communicates with a selected remote agricultural harvesting machine;
video information display logic that displays near real time video information received from a video camera on the selected remote agricultural harvesting machine; and
context information display logic that displays near real time context information, corresponding to the video information, received from the selected agricultural harvesting machine and generated based on sensor signals generated by sensors on the selected agricultural harvesting machine.

Example 18 is the mobile device of any or all previous examples wherein the machine selector logic is configured to display a plurality of different machine selector elements that are each actuatable to select a different remote agricultural harvesting machine, and further comprising:
a user interaction detector configured to detect user actuation of a plurality of the different machine selector elements to select a plurality of different remote agricultural harvesting machines.

Example 19 is the mobile device of any or all previous examples wherein the video information display logic is configured to display near real time video information received from a video camera on each of the plurality of selected remote agricultural harvesting machines and wherein the context information display logic is configured to display near real time context information, corresponding to the video information, received from each of the selected agricultural harvesting machines and generated based on sensor signals generated by sensors on each of the selected remote agricultural harvesting machines.

Example 20 is the mobile device of any or all previous examples and further comprising:
remote control generator logic configured to generate a user actuatable remote control element that is actuated to send a control signal to remotely control the selected remote agricultural harvesting machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural harvesting machine, comprising:
a crop processing system configured to process a crop that is gathered by the agricultural harvesting machine;
a visual information capture mechanism that captures visual information;
context information correlation logic that identifies context information corresponding to the visual information;
output generator logic configured to generate an output including the context information and corresponding visual information; and
a transmission system that transmits the output to a remote computing system, remote from the agricultural harvesting machine, for display of the context information and the corresponding visual information.

2. The agricultural harvesting machine of claim 1 wherein the visual information capture mechanism comprises:
a plurality of video cameras mounted on the agricultural harvesting machine and each capturing video information.

3. The agricultural harvesting machine of claim 2 wherein first context information corresponds to the video information from a first of the plurality of video cameras and second context information corresponds to the video information from a second of the plurality of video cameras, the first context information being different from the second context information.

4. The agricultural harvesting machine of claim 3 and further comprising:
a plurality of sensors each generating a sensor signal indicative of a sensed variable; and
a control system generating the context information based on the sensor signals.

5. The agricultural harvesting machine of claim 4 and, further comprising:
trigger detection logic configured to detect a trigger indicative of when the output including the context information and corresponding video information is to be transmitted to the remote computing system and generating a trigger signal identifying the video information based on detection of the trigger.

6. The agricultural harvesting machine of claim 5 wherein the trigger detection logic comprises:
a request detector detecting a request from the remote computing system, the request identifying which video information is to be transmitted.

7. The agricultural harvesting machine of claim 1, wherein the captured video information represents the crop in a crop processing system of the agricultural harvesting machine, and wherein the correlation logic is configured to identify the corresponding context information, that corresponds to the identified video information, for transmission with the identified video information.

8. The agricultural harvesting machine of claim 5 wherein the trigger detection logic comprises:
a continuous transmission detector generating the trigger signal indicating that the video information and corresponding context information is to be sent continuously, the transmission system being configured to continuously transmit the identified video information and corresponding context information to the remote computing system based on the trigger signal.

9. The agricultural harvesting machine of claim 5 wherein the trigger detection logic comprises:
an event detector detecting an event and generating the trigger signal indicating that the video information and corresponding context information is to be sent to the remote computing system based on the detected event, the transmission system being configured to continuously transmit the identified video information and corresponding context information to the remote computing system based on the trigger signal.

10. A method of controlling an agricultural harvesting machine, the method comprising:
performing, in a crop processing system of the agricultural harvesting machine, a crop processing operation on a crop gathered by the agricultural harvesting machine;
capturing video information using a video capture mechanism on the agricultural harvesting machine, the captured video information representing the crop in the crop processing system;
generating a sensor signal indicative of a sensed variable;
identifying context information, based on the sensor signal, corresponding to the video information;
generating an output including the context information and corresponding video information; and
transmitting the output to a remote computing system, remote from the agricultural harvesting machine, for display of the context information and the corresponding video information.

11. The method of claim 10 wherein capturing video information comprises:
capturing video information from each of a plurality of different video cameras mounted on the agricultural harvesting machine.

12. The method of claim 11 wherein identifying context information comprises:
identifying first context information corresponding to the video information from a first of the plurality of different video cameras; and
identifying second context information corresponding to the video information from a second of the plurality of video capture mechanisms, the first context information being different from the second context information.

13. The method, of claim 12 wherein generating a sensor signal comprises:
generating a plurality of different, sensor signals, each indicative of a different sensed variable; and
generating the context information based on the plurality of different sensor signals.

14. The method of claim 13 and further comprising:
detecting a request from the remote computing system; and
identifying, based on the request which video information is to be transmitted, wherein identifying context information includes identifying the corresponding context information, that corresponds to the identified video information for transmission with the identified video information.

15. The method of claim 14 wherein transmitting the output to the remote computing system comprises:
continuously transmitting the identified video information and corresponding context information to the remote computing system.

16. The method of claim 13 and further comprising:
detecting an event; and
identifying which video information and corresponding context information is to be sent to the remote computing system based on the detected event, wherein transmitting comprises continuously transmitting the identified video information and corresponding context information to the remote computing system based on the detected event.

17. A mobile device, comprising:
machine selector logic that displays a user actuatable machine selection element that is actuatable to select a remote agricultural harvesting machine, that is remote from the mobile device;
a communication system that communicates with a selected remote agricultural harvesting machine;
video information display logic that displays near real time video information received from a video camera on the selected remote agricultural harvesting machine; and
context information display logic that displays near real time context information, corresponding to the video information, received from the selected agricultural harvesting machine and generated based on sensor signals generated by sensors on the selected agricultural harvesting machine.

18. The mobile device of claim 17 wherein the machine selector logic is configured to display a plurality of different machine selector elements that are each actuatable to select a different remote agricultural harvesting machine, and further comprising:
- a user interaction detector configured to detect user actuation of a plurality of the different machine selector elements to select a plurality of different remote agricultural harvesting machines.

19. The mobile device of claim 18 wherein the video information display logic is configured to display near real time video information received from a video camera on each of the plurality of selected remote agricultural harvesting machines and wherein the context information display logic is configured to display near real time context information, corresponding to the video information, received from each of the selected agricultural harvesting machines and generated based on sensor signals generated by sensors on each of the selected remote agricultural harvesting machines.

20. The mobile device of claim 17 and further comprising:
- remote control generator logic configured to generate a user actuatable remote control element that is actuated to send a control signal to remotely control the selected remote agricultural harvesting machine.

* * * * *